(12) United States Patent
Bhuruth

(10) Patent No.: US 10,659,698 B2
(45) Date of Patent: May 19, 2020

(54) METHOD TO CONFIGURE A VIRTUAL CAMERA PATH

(71) Applicant: CANON KABUSHIKI KAISHA, Tokyo (JP)

(72) Inventor: Berty Jacques Alain Bhuruth, Bankstown (AU)

(73) Assignee: Canon Kabushiki Kaisha, Tokyo (JP)

( * ) Notice: Subject to any disclaimer, the term of this patent is extended or adjusted under 35 U.S.C. 154(b) by 59 days.

(21) Appl. No.: 16/136,108

(22) Filed: Sep. 19, 2018

(65) Prior Publication Data
US 2020/0092488 A1    Mar. 19, 2020

(51) Int. Cl.
| | |
|---|---|
| *H04N 5/225* | (2006.01) |
| *H04N 5/232* | (2006.01) |
| *G06T 7/70* | (2017.01) |
| *H04N 5/247* | (2006.01) |
| *G06K 9/00* | (2006.01) |

(52) U.S. Cl.
CPC ..... *H04N 5/23299* (2018.08); *G06K 9/00724* (2013.01); *G06T 7/70* (2017.01); *H04N 5/23206* (2013.01); *H04N 5/247* (2013.01)

(58) Field of Classification Search
CPC .......... H04N 5/23216; H04N 5/23222; H04N 5/23299; H04N 5/23206; H04N 5/247; G06T 2207/30241; G06T 7/292; G06T 7/70; G06K 9/00724
USPC ............................................. 348/143, 211.4
See application file for complete search history.

(56) References Cited

U.S. PATENT DOCUMENTS

| | | | |
|---|---|---|---|
| 6,281,930 B1 | 8/2001 | Parker | |
| 9,047,609 B2 | 6/2015 | Ellis | |
| 2009/0315978 A1* | 12/2009 | Wurmlin | G06T 5/005 348/43 |
| 2010/0020068 A1* | 1/2010 | House | G06T 15/20 345/419 |
| 2010/0208942 A1* | 8/2010 | Porter | H04N 13/122 382/106 |
| 2011/0113383 A1 | 5/2011 | Dyack | |
| 2014/0300687 A1* | 10/2014 | Gillard | G06T 15/20 348/36 |
| 2015/0172634 A1* | 6/2015 | Wheeler | H04N 21/21805 348/47 |

(Continued)

OTHER PUBLICATIONS

Kongwah Wan, Advertising Insertion in Sports Webcasts, IEEE MultiMedia journal, Apr.-Jun. 2007, pp. 78-82, vol. 14, Issue: 2, publisher: IEEE Computer Society, Tempe, Arizona, United States.

*Primary Examiner* — Usman A Khan
(74) *Attorney, Agent, or Firm* — Canon U.S.A., Inc. IP Division

(57) ABSTRACT

A computer-implemented system and method of configuring a path of a virtual camera. The method comprises receiving user steering information to control the path of the virtual camera in a scene; determining a primary target based upon a field of view of the virtual camera; and estimating a future path and a corresponding future field of view of the virtual camera, based on the received steering information. The method further comprises determining a secondary target of the scene proximate to the estimated future path of the virtual camera based on a preferred perspective of the secondary target; and configuring the path to capture the secondary target from the preferred perspective.

20 Claims, 10 Drawing Sheets

(56) References Cited

U.S. PATENT DOCUMENTS

| | | | |
|---|---|---|---|
| 2015/0326932 A1* | 11/2015 | Hill | .................... H04N 21/4312 725/32 |
| 2016/0132941 A1 | 5/2016 | Han | |
| 2018/0167553 A1 | 6/2018 | Yee | |

* cited by examiner

METHOD TO CONFIGURE A VIRTUAL CAMERA PATH

TECHNICAL FIELD

The present invention relates a system and method for controlling a virtual camera and in particular to a system and method of configuring a path of a virtual camera. The present invention also relates to a computer readable medium and apparatus for configuring a path of a virtual camera. The present invention also relates to a method for modifying a set of commands to navigate a virtual camera.

BACKGROUND

Techniques for camera framing and camera steering face a number of technical challenges in the broadcast industries. For example, sports broadcasters want to ensure that relevant action is presented in a timely and appropriate manner to viewers. The relevant action typically relates to a number of primary targets such as players or the like. The challenge of presenting appropriate action can become more difficult if a broadcaster wants to include other (secondary) targets without sacrificing coverage of the relevant action. The challenge has grown as virtual cameras become increasingly common. Determining whether a secondary target is in a field of view of a virtual camera whose parameters can be dynamically set poses a number of difficulties in comparison to using a fixed physical camera.

In the broadcasting industry for example, advertisements provide a considerable amount of revenue. This is often the case in sports broadcasting where companies negotiate deals with broadcasters and rights holders to have signage, graphics, and logos positioned on and around a playing field (either positioned physically, or virtually). In return, the signs, graphics, and logos, collectively referred to as advertisements, are exposed to a wider audience of viewers. However, the effectiveness of each advertisement is dependent on whether the advertisement is included in video or images captured and broadcasted by the broadcast cameras. The advertisements are examples of secondary targets. Other examples of secondary targets may relate to providing a particular experience for a viewer, for example showing a particular area such as a goal area, a feature of background scenery, a players' bench and the like. Secondary targets may also relate to identifying a location, for example including marker or a particular feature of reference. The broadcast cameras are typically controlled by individuals.

The individuals controlling the broadcast cameras are camera operators employed by the broadcaster. The role of the camera operators is to provide footage which clearly communicates the events of the game. While a camera operator could be directed to change the field of view of their camera towards an advertisement, the camera operator's primary directive is to capture footage of the events of the game. Whether or not an advertisement is included in the field of view is incidental.

As internet bandwidth increase and the capabilities of providing virtual cameras into broadcast environments such as a playing field grow, that the role of the camera operator is expected to shift towards the home viewer in the desire to provide each viewer a personal perspective. With a home viewer controlling a personal camera perspective, broadcasters will have less control over the exposure of the viewers to advertisement in the environment.

It is important for broadcasters that advertisements be in the field of view of the broadcast cameras. However, depending on the events of the game, and the location of the events in relation to the placement of the adverts, it is typically incidental if the person operating the camera perspective also includes an advertisement in the field of view of the camera.

Some methods to increase the likelihood of advertisements being the camera's field of view are known. One known method comprises virtually augmenting advert graphics onto a playing surface of a sports broadcast. The method uses a chroma key technique to create an illusion that the graphic is painted onto the surface. The method provides broadcasters the opportunity to easily swap advertisements while also positioning the advertisements in locations where there is high likely hood of the advertisements being seen. The method can be useful because the cameras which use the method are largely fixed in space, enabling only pan, tilt, roll and zoom adjustment capabilities. With the adjustment constraints, one could ascertain the regions which will experience high level of coverage. In camera systems that allow a greater degree of freedom (freedom in the X, Y, and Z axes in addition to pan, tilt, roll, and zoom) there is less certainty about which surfaces will experience high levels of coverage as more possible perspectives become viable.

Another known method comprises dynamically inserting an advertisement into the frames of a moving image. In particular, the method determines a series of frames where an advertising region is included. Based on the maximum available size for an advertising region, a piece of advertisement is selected and inserted into the region. The method also allows broadcasters to swap the advertisements which also appear in a scene. Apart from the benefit of not having to permanently position adverts, the method provides different advertisements the opportunity to be positioned in a finite amount of regions. However, similarly to the method described above, in a camera system which allows for a greater amount of degrees of freedom, then there is a greater chance that the camera field of view will not include an advertising region. The method can therefore result in no advertisement being shown.

SUMMARY

It is an object of the present invention to substantially overcome, or at least ameliorate, at least one disadvantage of present arrangements.

One aspect of the present disclosure provides a computer-implemented method of configuring a path of a virtual camera, said method comprising: receiving user steering information to control the path of the virtual camera in a scene; determining a primary target based upon a field of view of the virtual camera; estimating a future path and a corresponding future field of view of the virtual camera, based on the received steering information; determining a secondary target of the scene proximate to the estimated future path of the virtual camera based on a preferred perspective of the secondary target; and configuring the path to capture the secondary target from the preferred perspective and the primary target in a resultant field of view of the virtual camera.

According to another aspect, the secondary target is determined based on a magnitude of adjustment to the received user steering information to configure the path to capture the secondary target from the preferred perspective in the field of view.

According to another aspect, the secondary target is determined based on a proximity to a predicted final destination of the primary target.

According to another aspect, the secondary target is determined based on a level of exposure of the secondary target during an event.

According to another aspect, the secondary target is determined based on a level of exposure of the secondary target during an event, the exposure related to advertising revenue associated with the target.

According to another aspect, configuring the path of the virtual camera is further based on a determined characteristic of the user.

According to another aspect, configuring the path of the virtual camera is further based on a magnitude of the received user steering information.

According to another aspect, configuring the path of the virtual camera is further based on a time since a last virtual camera configuration.

According to another aspect, configuring the path of the virtual camera is further based on an amount of movement of the primary target.

According to another aspect, the scene is a sporting match and configuring the path is further based on occurrence of an event of the sporting match.

According to another aspect, configuring the path of the virtual camera comprises modifying at least one orientation parameter of the virtual camera.

According to another aspect, configuring the path of the virtual camera comprises modifying at least one positional parameter of the virtual camera.

According to another aspect, the secondary target is not visible in image data captured of the scene.

According to another aspect, the secondary target is not visible in image data captured of the scene, and the secondary target is augmented onto image data captured by the virtual camera using the configured path.

According to another aspect, the received user steerage information relates to receiving an indication of a trajectory of the virtual camera.

According to another aspect, the received user steerage information relates to panning the virtual camera.

According to another aspect, the method further comprises determining a level of modification of the path of the virtual camera based upon a characteristic of the user.

Another aspect of the present disclosure provides a non-transitory computer readable medium having a computer program stored thereon to implement a method of configuring a path of a virtual camera, said program comprising: code for receiving user steering information to control the path of the virtual camera in a scene; code for determining a primary target based upon a field of view of the virtual camera; code for estimating a future path and a corresponding future field of view of the virtual camera, based on the received steering information; code for determining a secondary target of the scene proximate to the estimated future path of the virtual camera based on a preferred perspective of the secondary target; and code for configuring the path to capture the secondary target from the preferred perspective and the primary target in a resultant field of view of the virtual camera.

Another aspect of the present disclosure provides a system, comprising: a network of cameras; a memory; and a processor, wherein the processor is configured to execute code stored on the memory for implementing a method comprising: configuring a virtual camera using video data of a scene captured by the network of cameras; receiving user steering information to control a path of the virtual camera in the scene; determining a primary target based upon a field of view of the virtual camera; estimating a future path and a corresponding future field of view of the virtual camera, based on the received steering information; determining a secondary target of the scene proximate to the estimated future path of the virtual camera based on a preferred perspective of the secondary target; and configuring the path to capture the secondary target from the preferred perspective and the primary target in a resultant field of view of the virtual camera.

Another aspect of the present disclosure provides apparatus configured to configure a path of a virtual camera, comprising: a memory; a processor configured to execute code stored on the memory to: receive user steering information to control the path of the virtual camera in a scene; determine a primary target based upon a field of view of the virtual camera; estimate a future path and a corresponding future field of view of the virtual camera, based on the received steering information; determine a secondary target of the scene proximate to the estimated future path of the virtual camera based on a preferred perspective of the secondary target; and configure the path to capture the secondary target from the preferred perspective and the primary target in a resultant field of view of the virtual camera.

Other aspects are also described,

BRIEF DESCRIPTION OF THE DRAWINGS

One or more example embodiments of the invention will now be described with reference to the following drawings, in which.

DETAILED DESCRIPTION INCLUDING BEST MODE

Figure 1:
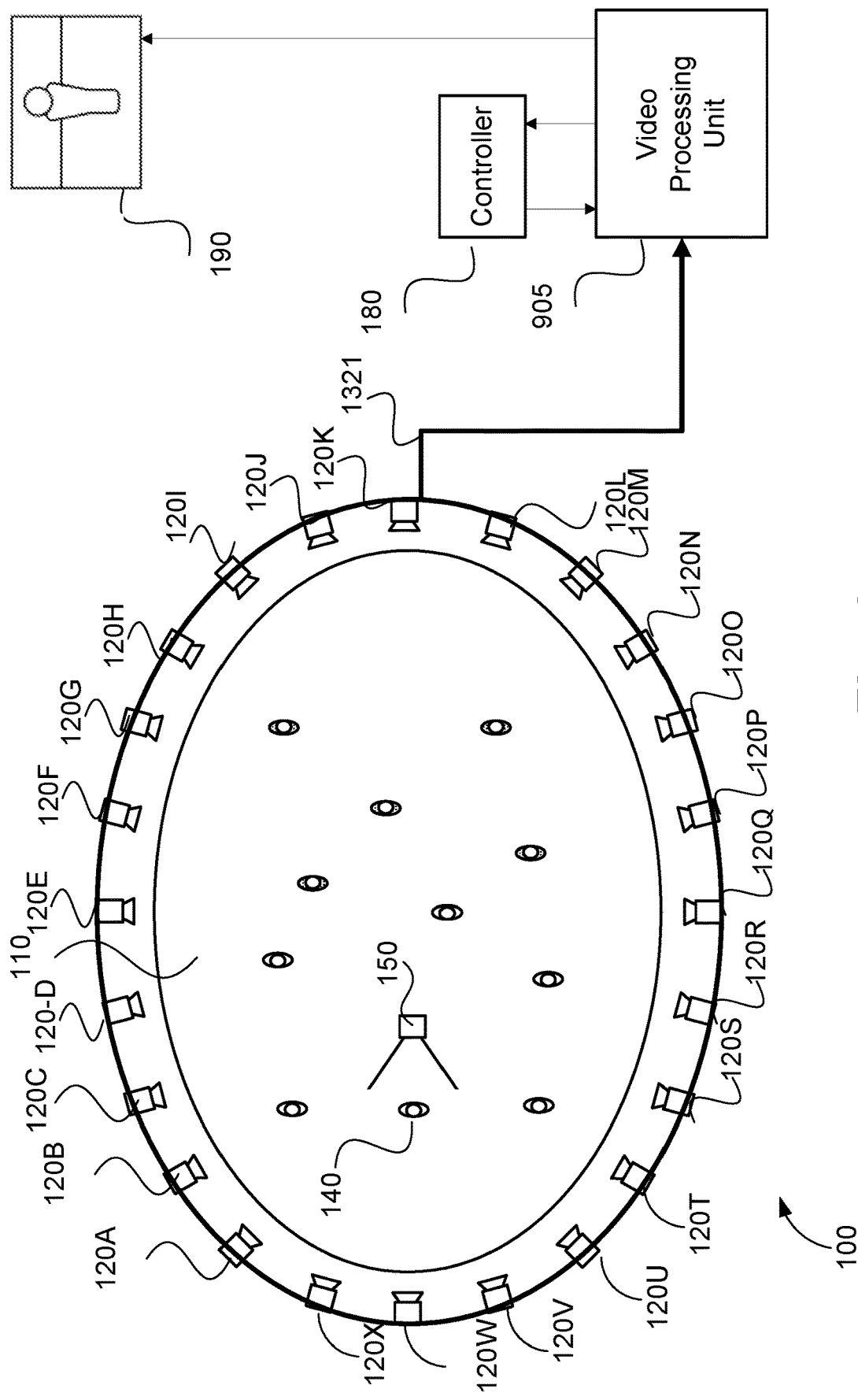
FIG. 1 shows a schematic block diagram of a system for configuring a path of a virtual camera.

Where reference is made in any one or more of the accompanying drawings to steps and/or features, which have the same reference numerals, those steps and/or features have for the purposes of this description the same function(s) or operation(s), unless the contrary intention appears.

The arrangements described herein relate to a method of modifying a virtual camera path to capture, in addition to a primary target within the camera field of view, a secondary target from one of a preferred perspective relative to the secondary target.

The arrangements described herein are intended for use in the context of a sports or similar performance field as exemplified in a system 100 shown in FIG. 1. A scene or arena 110 is centred on a playing field that is approximately oval. In other arrangements, the scene 110 may be another shape such as rectangular or circular. The field 110 is of a shape allowing the field 110 to be surrounded by one or more rings of cameras. In the example of FIG. 1, the arena 110 is surrounded by a single ring 120 of networked cameras 120A to 120X. In the example of FIG. 1 the scene 110 is a field, however in other arrangements the scene could be a music stage, theatre, public or private venue. The arrangements described relate to configuring video data relating to a real environment rather than a computer-generated environment. While the video data can be described as generating a virtual environment using a virtual camera, the generated virtual environment represents video data of events in the real environment.

The field 110, in the example of FIG. 1, contains objects such as an object 140. The object 140 could be a person, a ball, a vehicle or any structure. The cameras 120A to 120X are synchronised to acquire frames at the same instants in time so that all points on the field 110 are captured simultaneously from a large number of viewpoints. In some variations, the full ring of cameras 120 is not employed but rather some subsets of the full perimeter are employed. The cameras 120A to 120X can be any image capture devices suitable for capturing image data for use in synthesizing a virtual camera, for example a digital video camera or the like.

The captured video frames are subject to processing and temporary storage near the camera ring 120 prior to being made available via a network connection 921 to a computational video processing unit 905, also referred to as a processor. The computational video processing unit 905 receives controlling input from a controller 180. The controlling input specifies the position, orientation, zoom and possibly other simulated camera features for a virtual camera 150 generated from a viewpoint within the field 110. The role of the computational video processing unit 905 is to synthesise a specified virtual camera perspective 190 representing the virtual camera 150 based on the video streams available from the cameras 120A to 120X surrounding the field 110. "Virtual cameras" are referred to as virtual cameras because the functionality of the cameras is computationally derived. The functionality is computationally derived by methods such as interpolation between physical cameras or by rendering from a modelled three-dimensional scene constructed using data from many cameras surrounding the scene, rather than simply the output of any single physical camera.

A virtual camera location input may be generated by a human virtual camera operator, for example using the controller 180. The virtual camera location input can be based on input from a user interface device such as a joystick, mouse or similar controller including dedicated controllers comprising multiple input components. Alternatively, the virtual camera position may be generated fully automatically based on analysis of game play in the field 110. Hybrid control configurations are also possible whereby some aspects of the virtual camera positioning are directed by a human operator and others by an automated algorithm. Examples of hybrid controllers include the case where coarse positioning is performed by a human operator and fine positioning, including stabilisation and path smoothing is performed by the automated algorithm.

The computational video processing unit 905 achieves frame synthesis using one of known methods for free viewpoint generation. One example class of methods are model-based methods that reconstruct a full three-dimensional (3D) geometry of the scene. A second class are depth based methods that use depth estimation then generate free viewpoint video from image and depth data. A third class are image-based methods that use a type of interpolation of image data to form the free viewpoint video directly. Techniques used to generate a 3D geometry include structure from motion, shape-from-silhouette, visual hull reconstruction, shape from focus or defocus, structure from stereo and depth/disparity estimation algorithms for example. The image-based rendering methods are based on sampling pixel data from a set of cameras of know geometric arrangement and combining this information, into a synthesised frame. In addition to sample based rendering of the requested frame, the computational video processing unit 905 may also perform synthesis, 3D modelling, in-painting or interpolation of regions as required covering sampling deficiencies and creating frames of high quality visual appearance. Video streams 190 created by the computational video processing unit 905 may subsequently be provided to the production desk (not depicted) where the video streams can be edited together to form a broadcast video.

Figure 9A:
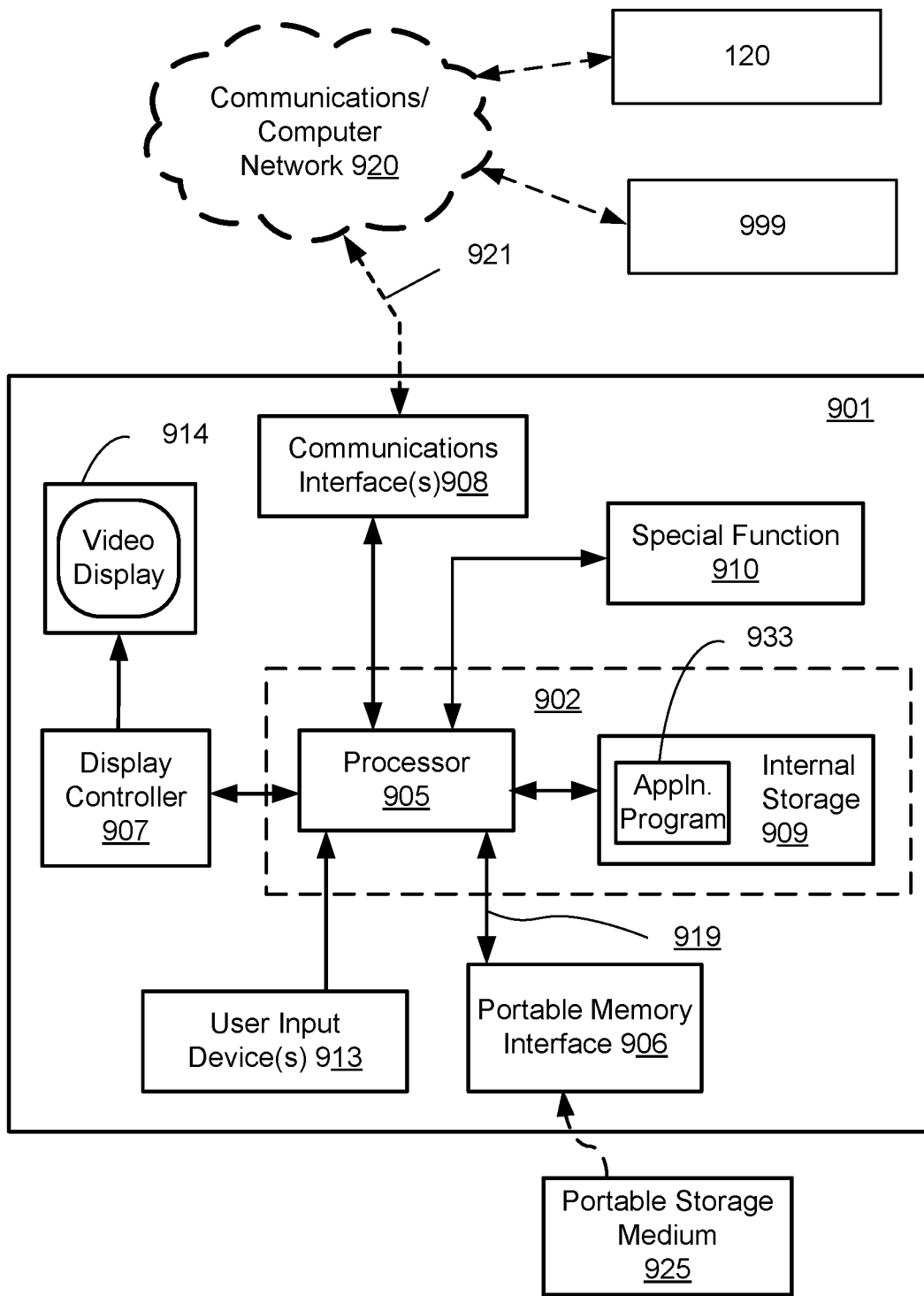
FIGS. 9A and 9B form a schematic block diagram of a general purpose computer on which the arrangements described may be practised
Figure 9B:
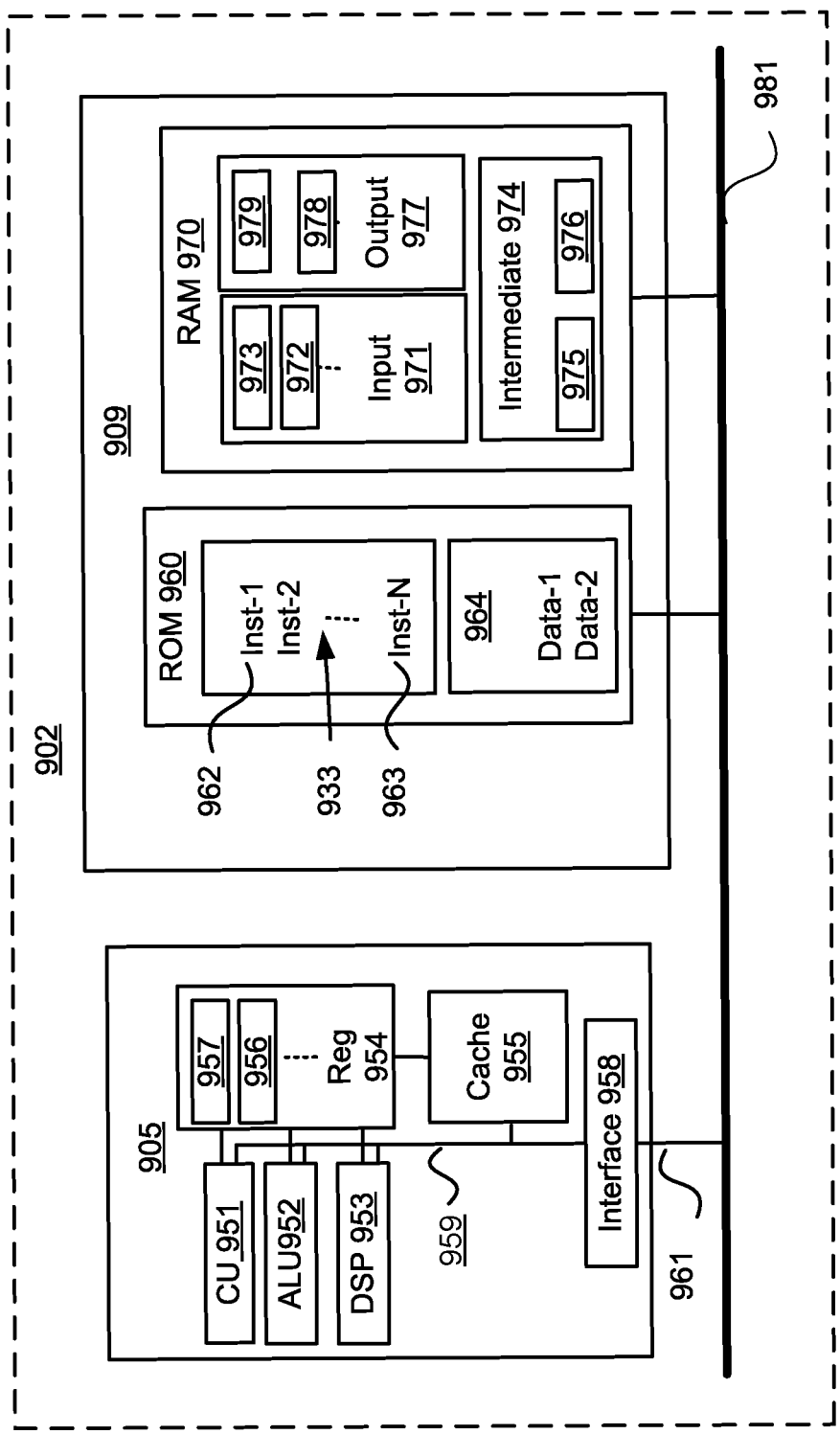

FIGS. 9A and 9B collectively form a schematic block diagram of a general purpose electronic device 901 including embedded components, upon which the methods to be described are desirably practiced. The electronic device 901 is preferably a device suitable for viewing and editing video footage such as a tablet. The electronic device 901 may also be, for example, a mobile phone, a portable media player or a digital camera, in which processing resources are limited. Nevertheless, the methods to be described may also be performed on higher-level devices such as desktop computers, server computers, and other such devices with significantly larger processing resources.

As shown in FIG. 9A, the electronic device 901 comprises an embedded controller 902. Accordingly, the electronic device 901 may be referred to as an "embedded device." In the present example, the controller 902 has the processing unit (or processor) 905 which is bi-directionally coupled to an internal storage module 909. The storage module 909 may be formed from non-volatile semiconductor read only memory (ROM) 960 and semiconductor random access memory (RAM) 970, as shown in FIG. 9B. The RAM 970 may be volatile, non-volatile or a combination of volatile and non-volatile memory.

The electronic device 901 includes a display controller 907, which is connected to a video display 914, such as a liquid crystal display (LCD) panel or the like. The display controller 907 is configured for displaying graphical images on the video display 914 in accordance with instructions received from the embedded controller 902, to which the display controller 907 is connected.

The electronic device 901 also includes user input devices 913 which are typically formed by keys, a keypad or like controls. In some implementations, the user input devices 913 may include a touch sensitive panel physically associated with the display 914 to collectively form a touch-screen. Such a touch-screen may thus operate as one form of graphical user interface (GUI) as opposed to a prompt or menu driven GUI typically used with keypad-display combinations. Other forms of user input devices may also be used, such as a microphone (not illustrated) for voice commands or a joystick, thumb wheel, or game pad (not illustrated) for ease of navigation about menus. User input for controlling a virtual camera may be received via the input devices 913, typically via the touch-screen 914 if the device 901 is a tablet computer.

As seen in FIG. 9A, the electronic device 901 also comprises a portable memory interface 906, which is coupled to the processor 905 via a connection 919. The portable memory interface 906 allows a complementary portable memory device 925 to be coupled to the electronic device 901 to act as a source or destination of data or to supplement the internal storage module 909. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The electronic device 901 also has a communications interface 908 to permit coupling of the device 901 to a computer or communications network 920 via the connection 921. The connection 921 may be wired or wireless. For example, the connection 921 may be radio frequency or optical. An example of a wired connection includes Ethernet. Further, an example of wireless connection includes Bluetooth™ type local interconnection, Wi-Fi (including protocols based on the standards of the IEEE 802.11 family), Infrared Data Association (IrDa) and the like.

Typically, the electronic device 901 is configured to perform some special function. The embedded controller 902, possibly in conjunction with further special function components 910, is provided to perform that special function. For example, where the device 901 is a digital camera, the components 910 may represent a lens, focus control and image sensor of the camera. The special function component 910 is connected to the embedded controller 902. As another example, the device 901 may be a mobile telephone handset. In this instance, the components 910 may represent those components required for communications in a cellular telephone environment. Where the device 901 is a portable device, the special function components 910 may represent a number of encoders and decoders of a type including Joint Photographic Experts Group (JPEG), (Moving Picture Experts Group) MPEG, MPEG-1 Audio Layer 3 (MP3), and the like.

The methods described hereinafter may be implemented using the embedded controller 902, where the processes of FIGS. 2, 3, 6 and 8 may be implemented as one or more software application programs 933 executable within the embedded controller 902. The electronic device 901 of FIG. 9A implements the described methods. In particular, with reference to FIG. 9B, the steps of the described methods are effected by instructions in the software 933 that are carried out within the controller 902. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 933 of the embedded controller 902 is typically stored in the non-volatile ROM 960 of the internal storage module 909. The software 933 stored in the ROM 960 can be updated when required from a computer readable medium. The software 933 can be loaded into and executed by the processor 905. In some instances, the processor 905 may execute software instructions that are located in RAM 970. Software instructions may be loaded into the RAM 970 by the processor 905 initiating a copy of one or more code modules from ROM 960 into RAM 970. Alternatively, the software instructions of one or more code modules may be pre-installed in a non-volatile region of RAM 970 by a manufacturer. After one or more code modules have been located in RAM 970, the processor 905 may execute software instructions of the one or more code modules.

The application program 933 is typically pre-installed and stored in the ROM 960 by a manufacturer, prior to distribution of the electronic device 901. However, in some instances, the application programs 933 may be supplied to the user encoded on one or more CD-ROM (not shown) and read via the portable memory interface 906 of FIG. 9A prior to storage in the internal storage module 909 or in the portable memory 925. In another alternative, the software application program 933 may be read by the processor 905 from the network 920, or loaded into the controller 902 or the portable storage medium 925 from other computer readable media. Computer readable storage media refers to any non-transitory tangible storage medium that participates in providing instructions and/or data to the controller 902 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the device 901. Examples of transitory or non-tangible computer readable transmission media that may also participate in the provision of software, application programs, instructions and/or data to the device 901 include radio or infra-red transmission channels as well as a network connection to another computer or networked device, and the Internet or Intranets including e-mail transmissions and information recorded on Websites and the like. A computer readable medium having such software or computer program recorded on it is a computer program product.

The second part of the application programs 933 and the corresponding code modules mentioned above may be executed to implement one or more graphical user interfaces (GUIs) to be rendered or otherwise represented upon the display 914 of FIG. 9A. Through manipulation of the user input device 913 (e.g., the keypad), a user of the device 901 and the application programs 933 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 9B illustrates in detail the embedded controller 902 having the processor 905 for executing the application programs 933 and the internal storage 909. The internal storage 909 comprises read only memory (ROM) 960 and random access memory (RAM) 970. The processor 905 is able to execute the application programs 933 stored in one or both of the connected memories 960 and 970. When the electronic device 901 is initially powered up, a system program resident in the ROM 960 is executed. The application program 933 permanently stored in the ROM 960 is sometimes referred to as "firmware". Execution of the firmware by the processor 905 may fulfil various functions, including processor management, memory management, device management, storage management and user interface.

The processor 905 typically includes a number of functional modules including a control unit (CU) 951, an arithmetic logic unit (ALU) 952, a digital signal processor (DSP) 953 and a local or internal memory comprising a set of registers 954 which typically contain atomic data elements 956, 957, along with internal buffer or cache memory 955.

One or more internal buses 959 interconnect these functional modules. The processor 905 typically also has one or more interfaces 958 for communicating with external devices via system bus 981, using a connection 961.

The application program 933 includes a sequence of instructions 962 through to 963 that may include conditional branch and loop instructions. The program 933 may also include data, which is used in execution of the program 933. This data may be stored as part of the instruction or in a separate location 964 within the ROM 960 or RAM 970.

In general, the processor 905 is given a set of instructions, which are executed therein. This set of instructions may be organised into blocks, which perform specific tasks or handle specific events that occur in the electronic device 901. Typically, the application program 933 waits for events and subsequently executes the block of code associated with that event. Events may be triggered in response to input from a user, via the user input devices 913 of FIG. 9A, as detected by the processor 905. Events may also be triggered in response to other sensors and interfaces in the electronic device 901.

The execution of a set of the instructions may require numeric variables to be read and modified. Such numeric variables are stored in the RAM 970. The disclosed method uses input variables 971 that are stored in known locations 972, 973 in the memory 970. The input variables 971 are processed to produce output variables 977 that are stored in known locations 978, 979 in the memory 970. Intermediate variables 974 may be stored in additional memory locations in locations 975, 976 of the memory 970. Alternatively, some intermediate variables may only exist in the registers 954 of the processor 905.

The execution of a sequence of instructions is achieved in the processor 905 by repeated application of a fetch-execute cycle. The control unit 951 of the processor 905 maintains a register called the program counter, which contains the address in ROM 960 or RAM 970 of the next instruction to be executed. At the start of the fetch execute cycle, the contents of the memory address indexed by the program counter is loaded into the control unit 951. The instruction thus loaded controls the subsequent operation of the processor 905, causing for example, data to be loaded from ROM memory 960 into processor registers 954, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

The approach of the methods described increases the likelihood of advertisement appearing within the field of view of the virtual camera. The likelihood is increased by enabling the application 933 to modify the trajectory of the user controlled camera path towards camera position and orientations which include said advertisements. While the examples described relate to visibility of advertisements, the arrangements described could extend to any secondary target which the broadcaster deems important.

Repositioning the virtual camera to frame an identified secondary target without considering the original intent of the camera operator can serve the needs of broadcasters. However, repositioning the virtual camera without considering the original intent would go against the needs of the operator. Therefore, it is preferred that the virtual camera be repositioned in addition to keeping the primary target within the field of view as the trajectory adjustment is made.

Figure 2:
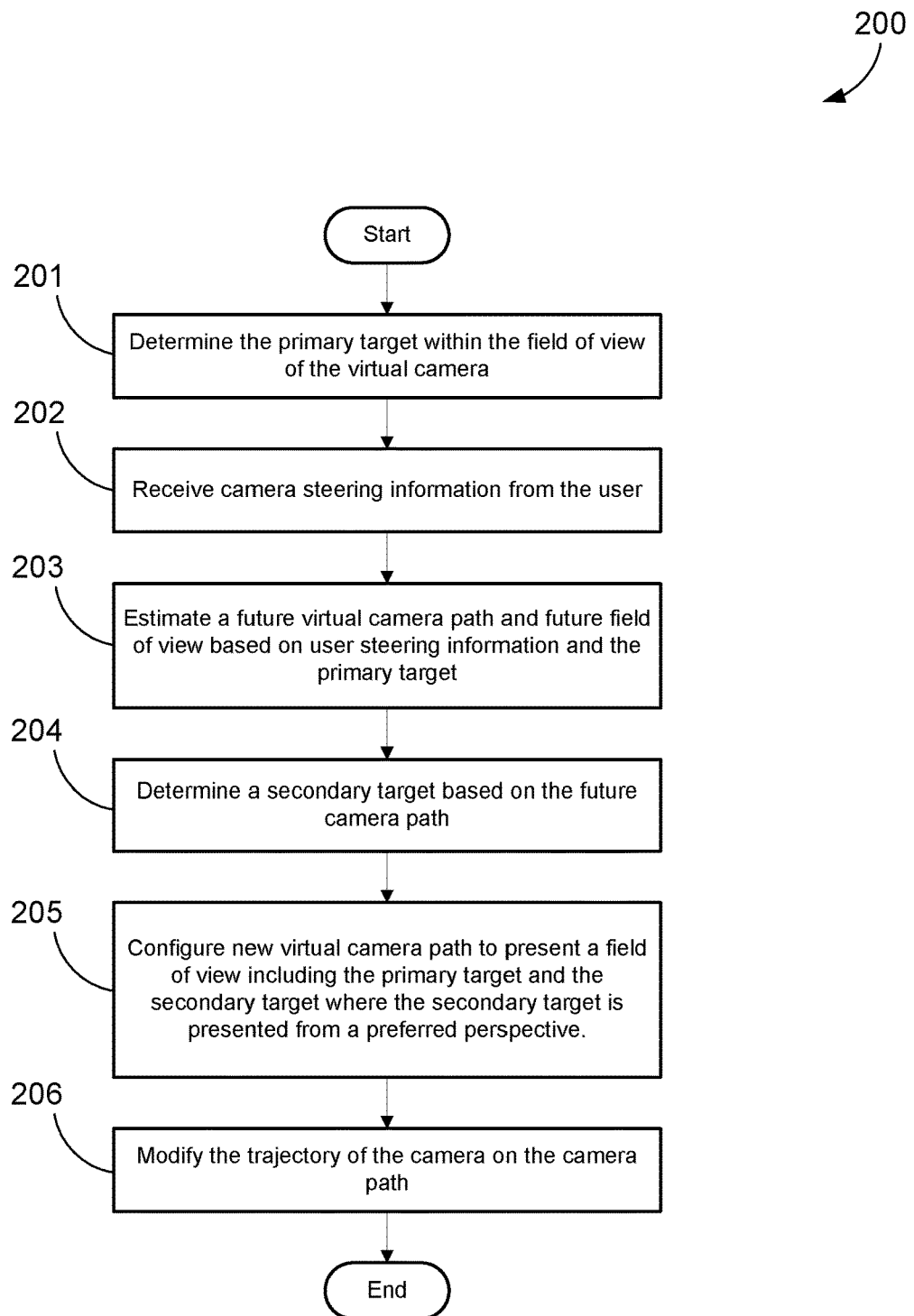
FIG. 2 shows a method of configuring a path of a virtual camera.

FIG. 2 is a flowchart presenting a method 200 of configuring a trajectory of a virtual camera. The method 200 is typically implemented as one or more modules of the application 933, stored in the memory 906 and controlled under execution of the processor 905.

The method 200 starts at step 201. Step 201 executes to determine the primary target within a field of view of the virtual camera 150. The virtual camera 150 may be an existing virtual camera generating video data synthesized using the cameras 120A-120X. Alternatively, the virtual camera 150 may be configured at step 201, for example based on user instructions or object tracking. In the context of the present disclosure, a variety of objects could constitute a primary target. A primary target is made up of at least one object in the scene 110. Each object could be moving, static, or a combination of moving and static. In a sporting use case, examples of objects which could combine to become primary targets are players, a ball, goal areas, and officials.

The arrangements described can use known methods to determine a primary target. To determine a primary target requires a means of target recognition and classification. The requirements of target recognition and classification can be met both by manual operation by a person or automatically through computer implementation. An example of a manual method is a human operator visually identifying a target and then classifying said target. A main limitation of the manual-human operated method is difficulty to perform identification and classification in real-time or near real-time. Therefore, the manual method would be better suited for implementation post-match for later replay by viewers. An example of computer implemented methods for determining a primary target include determining the object (or set of objects) which experience the most amount of time in the centre of the camera's field of view. Alternately, the application 933 could determine the object (or set of objects) that occupies the highest percentage of the camera's field of view. Alternately, the primary target could be determined by determining the total continuous amount of time an object (or set of objects) has been within the field of view of the camera. An implemented method could also use a combination of the described techniques.

A component of determining the primary target includes determining an estimated trajectory of the primary target. Determining an estimated trajectory can be implemented manually by a human operator or automatically with computer implementation. For example, after identifying and classifying a target, a human operator using a computer could incrementally progress through the timeline of the game, and at each increment define the position of the primary target. The collection of defined positions would build a database of target positions for later referencing. A single human operator could only manage to identify for a small amount of possible primary targets. A soccer game, for example, typically has 22 players, a referee, 2 assistant referees, and a ball one field at one time. Ensuring all the potential targets are properly located would require multiple human operators and added expense. As described above, the manual method is difficult to implement in real-time and would be better suited for replay use cases. An example of a computer implemented methods for determining a trajectory includes determining an initial velocity and trajectory for the target and extrapolating the velocity and trajectory forward into the future. An alternate method may utilise machine learning techniques to determine the likely trajectory of the target. The machine learning method would require the machine learning algorithm to be trained on movements of the objects on the field. The machine learning algorithm could also incorporate boundaries of the game and the physical space. For example, the algorithm could be trained to know that a player will likely not travel a considerable amount of distance outside of the playing space. Therefore, the estimated trajectory for the primary target could predict the target slowing their momentum after crossing the games boundary line.

The method 200 continues under execution of the processor 905 from step 201 to a receiving step 202. Step 202 executes to receive camera steering information from a user of the module 901. The user can for example be a professional photographer controlling operation of the virtual camera for real-time video broadcast for example, or a home user controlling the virtual camera for personal viewing in near real-time or playback.

Camera steering information could be inputted by a user of the module 901 through the user input device 913 for example. The steering information typically comprises instructions for the application 933 to modify various parameters of the virtual camera 150. The parameters of the virtual camera 150 include the positional coordinates (represented as X, Y, and Z location values) as well as the orientation coordinates (represented as Pan, Tilt, and Roll values) of the virtual camera 150. Camera lens parameters (such as zoom and focus) can also form parameters of the virtual camera. However, in the context of the arrangements described, steerage information relates at least to information resulting indicating a trajectory or path of the virtual camera 150. The trajectory (path) can relate to movement of the virtual camera 150 in the scene 110 or panning the virtual camera 150 at a location in the scene 110. For example, the steerage information can relate to moving the virtual camera in a certain speed and/or direction, to a particular location or to pan a portion of the scene 110.

Alternatively, a user can provide camera steering information to the application 933 in the form of prescribing an initial camera path for the virtual camera 150 to follow. Alternatively, camera steering information can be generated by an automatic camera tracking algorithm, after a user has given instructions to said camera tracking algorithm.

The method 200 continues user execution of the processor 905 from step 202 to an estimating step 203. Step 203 executes to estimate a future virtual camera path based on user steering information and the trajectory of the primary target. Determining the future path of the virtual camera path includes determining a future field of view of the virtual camera 150. The application 933 estimates a future virtual camera path in the same or similar manner as in step 201 for estimating the trajectory of the primary target. The application 933 determines the future field of view of the virtual camera 150 based on the estimated trajectory of the virtual camera 150 and the estimates trajectory of the primary target. The application 933 estimates a virtual camera position, orientation and field of view which has the primary target in the camera's framing along the estimated camera path. The application 933 operates to estimate a camera position, orientation and field of view which has the primary target in the virtual camera's field of view at least at one point of the estimated path, preferably at each of a number of points along the estimated path. The primary target is typically in the field of view at each point in the estimated path as determined based on the estimated trajectory.

The method 200 continues under execution of the processor from step 203 to a determining step 204. Step 204 operates to determine a secondary target based on the future camera path estimated in execution of step 203. A method 300 of determining the secondary target based on the future camera path as implemented at step 204 is described in relation to FIG. 3. At the conclusion of step 204, the application 933 has selected an object (or set of objects) to be the secondary target.

The method 200 continues from step 204 to a configuration step 205. Step 205 executes to configure the virtual camera path to synthesize a field of view including the primary target and the secondary target. Further, the secondary target is presented from a preferred perspective in the synthesized field of view. To achieve preferred presentation of the secondary target, the application 933 determines the transformation of the camera path and field of view to transition the camera into a position and orientation where the primary target is in the field of view of the camera as well as the secondary target. The transformation is also determined so that the secondary target is viewed from a preferred perspective. The application 933 typically determines the minimum amount of transformations required to move the camera smoothly and gradually into place for viewing the secondary target. The concept of a target's preferred perspective is described further in relation to FIG. 4 hereafter. To configure the camera path, the application 933 derives a new future camera path and future field of view using the camera path and field of view transformations. In some implementations, step 205 can operate to modify camera parameters that do not affect a path (such as tilt, zoom and the like) in addition to modifying or configuring the path.

The method continues from step 205 to a modifying step 206. Execution of step 206 modifies or configures the trajectory (path) of the virtual camera 150 to capture the selected secondary target and the primary target. The application 933 modifies the trajectory of the virtual camera 150 by modifying the steering information received at step 202 so that the virtual camera 150 moves in accordance with the new future camera path and future field of view generated at step 205.

Figure 3:
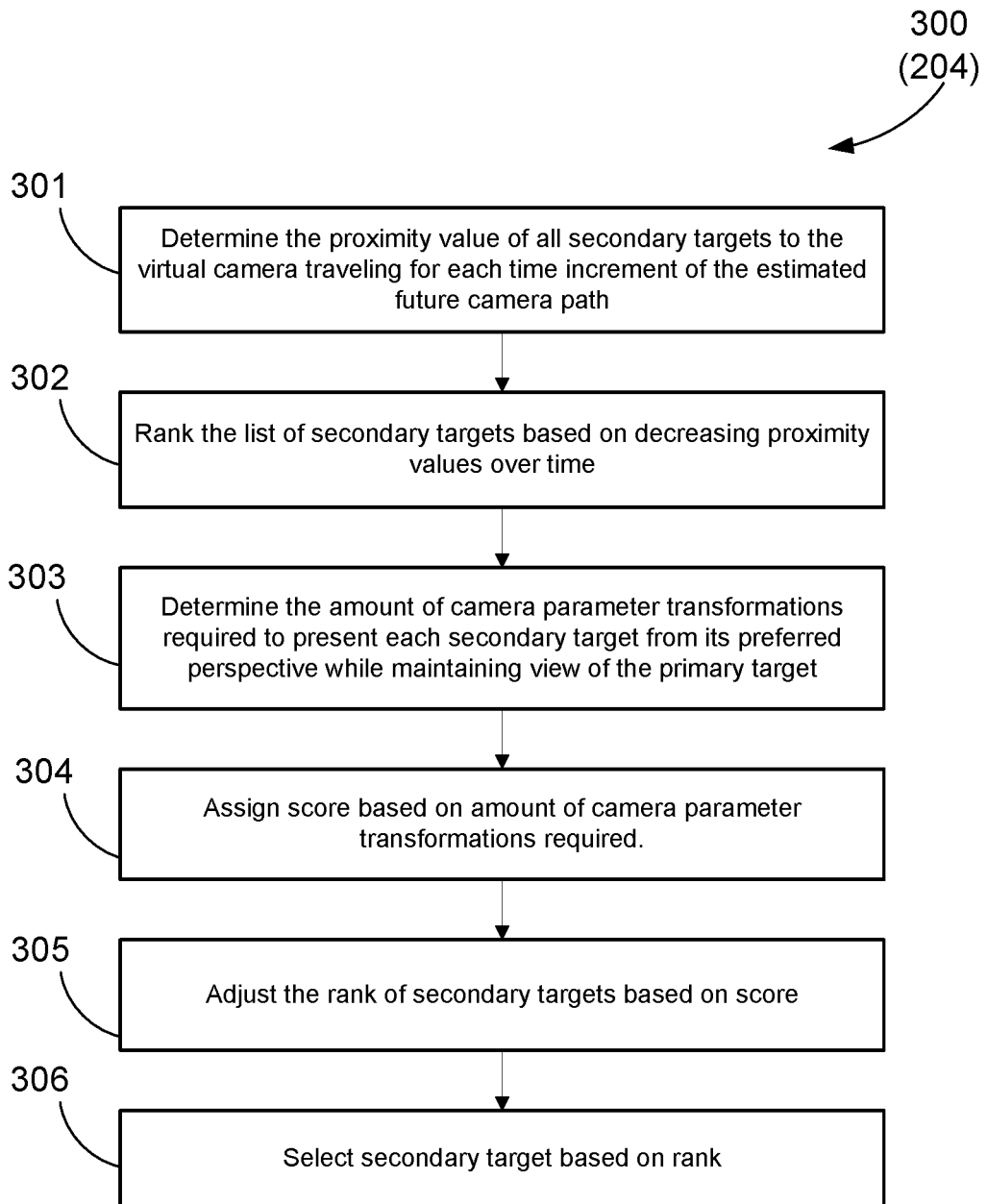
FIG. 3 shows a method of determining a secondary target as used in the method of FIG. 2.

FIG. 3 is a flowchart of the method 300 of determining a secondary target based on the future camera path, as implemented at step 204 of the method 200. The method 300 is typically implemented as one or more modules of the application 933, stored in the memory 906 and controlled under execution of the processor 905.

The method 300 starts at a determining step 301. Execution of step 301 determines a proximity value of all secondary targets to the virtual camera 150 traveling for each time increment of the estimated future camera path. In other arrangements, the proximity is determined relative to the estimated future field of view of the virtual camera 150. For each time increment that the virtual camera 150 is to move along the estimated future camera path, the application 933 collects proximity values for each secondary target (or set of targets). The application 933 at step 301 could determine that the trajectory of the primary target will result in the target reaching a destination. In the context of the arrangements described, a final destination is a position in the scene 110 where the primary target will conclude or perform a particular action.

The determination of when the current action will conclude can be predicted in real time using an understanding of how known objects are likely to interact with each other. Examples include a ball hitting a net, players colliding with each other, or a player reaching an end-zone/try-line. For example, the final destination may be a player passing a ball (based on a likelihood within a certain period of time) or kicking towards a goal (based on trajectory or position). In a replay implementation, the conclusion of the action can be also be determined after the action as occurred if the application 933 executes to store a record of when and when the target concluded their action at step 301, for example in the memory 906. By determining the final destination of the primary target, the application 933 can execute at step 301 to determine the proximity of the secondary targets to the virtual camera along the estimated trajectory.

The method 300 continues from step 301 to a ranking step 302. Execution of step 302 ranks the list of secondary targets in the scene 110 based on secondary targets with decreasing proximity values over time relative to the virtual camera 150 moving along the estimated future path. Alternatively, the proximity may be relative to the future estimated field of view of the virtual camera 150. Step 301 can relate to a proximity to a predicted final destination of the primary target or a predicted location along the estimated future trajectory. In step 302, the application 933 effectively considers secondary targets which the virtual camera 150 is moving towards as most preferred. The secondary targets can be determined using known object identification methods. The proximity values are determined relative to a position of each secondary object from the primary object in the estimated field of view as the virtual camera 150 moves along the estimated future camera path.

The method 300 continues from step 302 to a determining step 303. Execution of step 303 determines the amount of camera parameter transformations required to present each secondary target from the secondary target's preferred perspective while maintaining a view of the primary target. The determined amount is typically based on the amount of camera parameter transformations required to smoothly (and gradually) reposition the virtual camera 150 from the current estimated position and orientation to a future estimated position and orientation. The future position and orientation relate to a virtual camera that includes the primary target within the field of view of the camera, as well as the secondary target viewed from a preferred perspective. Description of a preferred perspective of a secondary target is made in relation to FIG. 4.

The method 300 continues from step 303 to an assigning step 304. Execution of step 304 assigns a score based on amount of camera parameter transformations required. Each secondary object receives a score reflecting a relationship with the amount of required transformation. If the virtual camera requires a relatively small amount of transformation, the secondary object receives a relatively high score. If the virtual camera requires a relatively large amount of transformation, the secondary object receives a relatively low score. Therefore, the application 933 considers secondary targets which require the least amount of reconfiguring of the user's original steering information to be preferred. In other arrangements, score may be proportional to transformation. The level of transformation classed as low or high may depend on the circumstances of the scene, for example the size of the field, the speed and nature of the sport and the like.

The method continues from step 304 to an adjusting step 305. Execution of step 305 adjusts the rank of secondary targets based on the assigned score. In step 305, the application 933 can increase the rank of a secondary object if the secondary target receives a high score. In the example described the high score indicates a relatively simple transformation of the virtual camera's parameters into an ideal camera pose.

The method 300 continues from step 305 to a selecting step 306. Execution of step 306 selects the secondary target based on the rank determined at step 305. For example, the secondary target with a preferred perspective which is the highest ranked can be selected. The method 300 ends upon execution of step 306.

Figure 4:
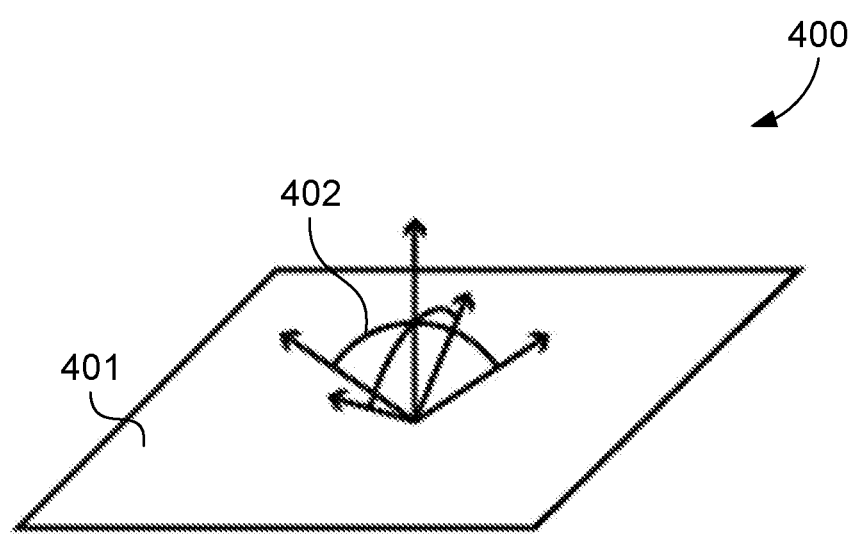
FIG. 4 an example secondary target.

FIG. 4 shows an illustration of an example secondary target 400. The secondary target 400 has multiple characteristics. The arrangements described relate to a geometry or shape 401 of the target 400 and a preferred perspective 402 of the target 400. In the example of FIG. 4 the geometry 401 is two-dimensional (2D). However, in other implementations the target's geometry 401 could be three-dimensional (3D). In typical implementations, the geometry 401 of the target 400 will also comprise a texture or design. However, for a virtual environment, the arrangements described allow for targets without texture, design, or any special appearance. For example, the target 400 can be a computer generated geometric region that is not visible in an image captured by any of the cameras 120A to 120X. The computer generated geometric region can be modified when an image synthesized by the virtual camera 150 is processed to include a computer-generated advertisement or game statistics, or other computer generated information or graphics by way of assigning the surface of computer generated geometric region an appearance (i.e., texture, design, or special appearance). The computer-generated graphics of information is augmented onto the image data of the virtual camera. The geometric region invisible to the cameras 120A to 120X could also signify an abstract region that is a likely high-action area, such as a particular region of the field 110, for example the area in front of the goals. If the geometric region is a likely high-action area, the secondary target is not for displaying graphical content but instead to assist the user in viewing a focal point of the field.

The preferred perspective 402 is defined by the author of the secondary target 400. The preferred perspective is used to represent a range of possible perspectives which capture the secondary target from an ideal camera perspective. For example, the range of acceptable perspectives for which the target prefers to be viewed from could be 30° offset from perpendicular.

Figure 5A:
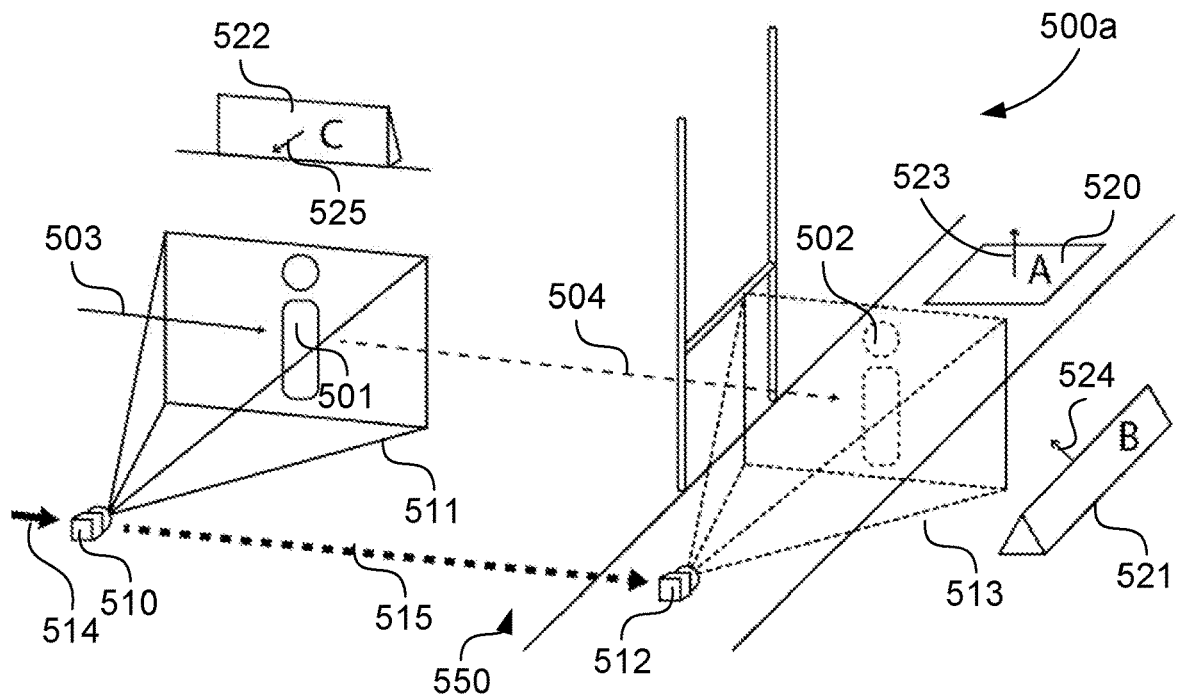
FIGS. 5A and 5B each show an example of modifying a path of a virtual camera in a scene.
Figure 5B:
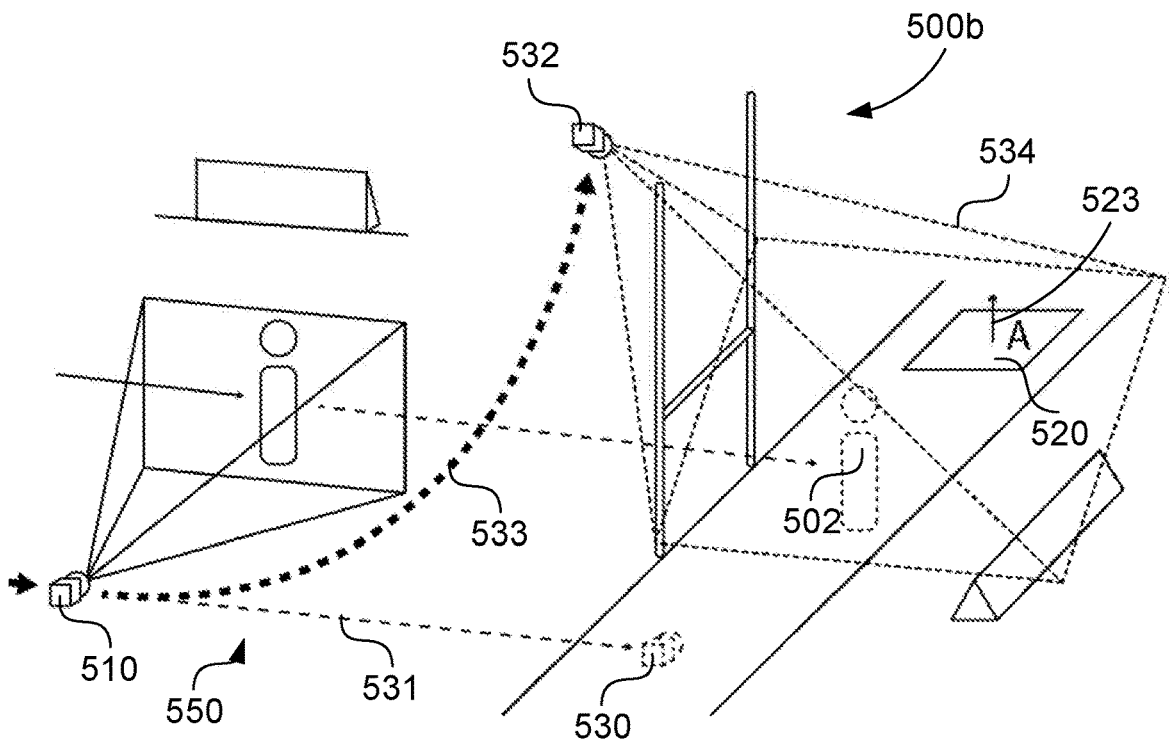

FIG. 5A and FIG. 5B provide illustrations of scenes 500a and 500b respectively. The scenes 500a and 500b relate to a sporting field 550. The scene 500a includes a primary target 501 and a virtual camera 510. The scene 500a also includes multiple secondary targets 520, 521, and 522.

As part of step 201 of the method 200, the application 933 selects the primary target 501 because of the primary target's (501) relationship with a field of view 511 of the virtual camera 510. The application 933 also determines the future trajectory of the primary target 501. The application 933 determines the future trajectory by extrapolating the primary target's (501) previous velocity and trajectory 503 to estimate a future trajectory or path 504. Determining the future trajectory 504 results in the primary target 501 being determined to move to a new position 502. The new position 502 can in some implementations be determined to be an expected (predicted) final destination of the primary target 501.

In execution of step 203 of the method 200, the application 933 estimates a future camera path 515 of the virtual camera 510. The application 933 estimates the future path 515 by extrapolating the current camera path 514 using the velocity of the camera 510 as well as incorporating the user's current steering information received in step 203 via the input devices 913 to determine a future camera position 512. The application 933 also estimates a future field of view 513 of the virtual camera 510 based on the future camera path 515 and the estimated primary target position 502. The arrangements described relate to steering information received from the input devices 913. In other implementations, the steering information may be received via the controller 180 and provided to the module 901. For example, a professional user may be more likely to use the controller 180, whereas a home user may be more likely to use inputs such as the inputs 913. The controller 180 may operate in a similar manner to the module 901 to and configure the virtual camera path in other implementations. The controller 180 can have inputs such as a joystick or other inputs similar to the inputs 913.

In execution of step 204 of the method 200, the application 933 determines which of the secondary targets 520, 521 and 522 is the preferred secondary target.

The application 933 determines the preferred secondary target by executing the method 300, starting with step 301. The application 933 determines proximity values of the secondary objects 520, 521 and 522 for each time increment that the camera 510 moves along the future camera path 515. The proximity values can be determined relative to the location of the virtual camera 510 along the path 515, or the resultant estimated field of view of the camera 510 at the position 512.

The application 933 proceeds to execute step 302 and rank the secondary targets 520, 521 and 522 based on the determined proximity values over time. In the example of FIG. 5A, the secondary target 521 ranks highest, followed by the secondary target 520, and the secondary target 522.

The application 933 executes step 303 for each secondary target to determine the amount of camera parameter transformations that the virtual camera 510 requires in order to view the primary target 502 as well as view each of the secondary targets 520, 521 and 522 from the corresponding preferred perspectives (523, 524 and 525 respectively).

The application 933 executes step 304 to assign a score to each secondary target based on the amount of camera transformation determined at step 303. In the example of FIG. 5A, the secondary target 520 receives the highest score as the future field of view 513 already has the secondary object 520 within view. Accordingly, a relatively low amount of transformation is required to capture the target 520 from the preferred perspective 523 in the field of view of the virtual camera 510 based on the trajectory 515. The secondary target 521 receives a relatively moderate to low score as the secondary target 521 is outside of the future field of view 513. Accordingly, a larger rotation transformation is required to view secondary target 521 from the corresponding preferred perspective 524 in the future field of view 513. The secondary target 522 receives the lowest score as the secondary target 522 is outside of the future field of view 513 and in the opposite direction from the future camera path 515. Accordingly, a relatively large position and rotation transformation is required to view the secondary target 522 from the corresponding preferred perspective 525 in the future field of view 513.

The application 933 executes at step 305 to adjust the rank of secondary targets based on the score derived from the amount of require camera parameter transformation. In the example of FIG. 5A, while the secondary target 521 is closest to the field of view 513 according to proximity, the high score of secondary target 520 means the secondary target 520 is moved rank to the highest.

The application 933 at execution of step 306 selects the highest ranking secondary target 520.

In executing step 205 of the method 200, the application 933 configures a modified (updated) virtual camera path 533, shown in FIG. 5B, to synthesize or generate a field of view 534 for the virtual camera 510. The virtual camera 510 is transformed to a location 532. The field of view 534 includes the primary target 502 and the secondary target 520, with the secondary target 520 presented from the preferred perspective 523.

In executing step 206 of the method 200, the application 933 ensures the camera 510 follows the trajectory of the new virtual camera path 533 by modifying the user's original steering information so that the virtual camera 510 moves in accordance with the new future camera path 533 and synthesizes the future field of view 534. Accordingly, the virtual camera 510 is not moved based upon the original trajectory 515 (represented as 531 in FIG. 5B) and the original camera position and orientation 530.

Figure 6:
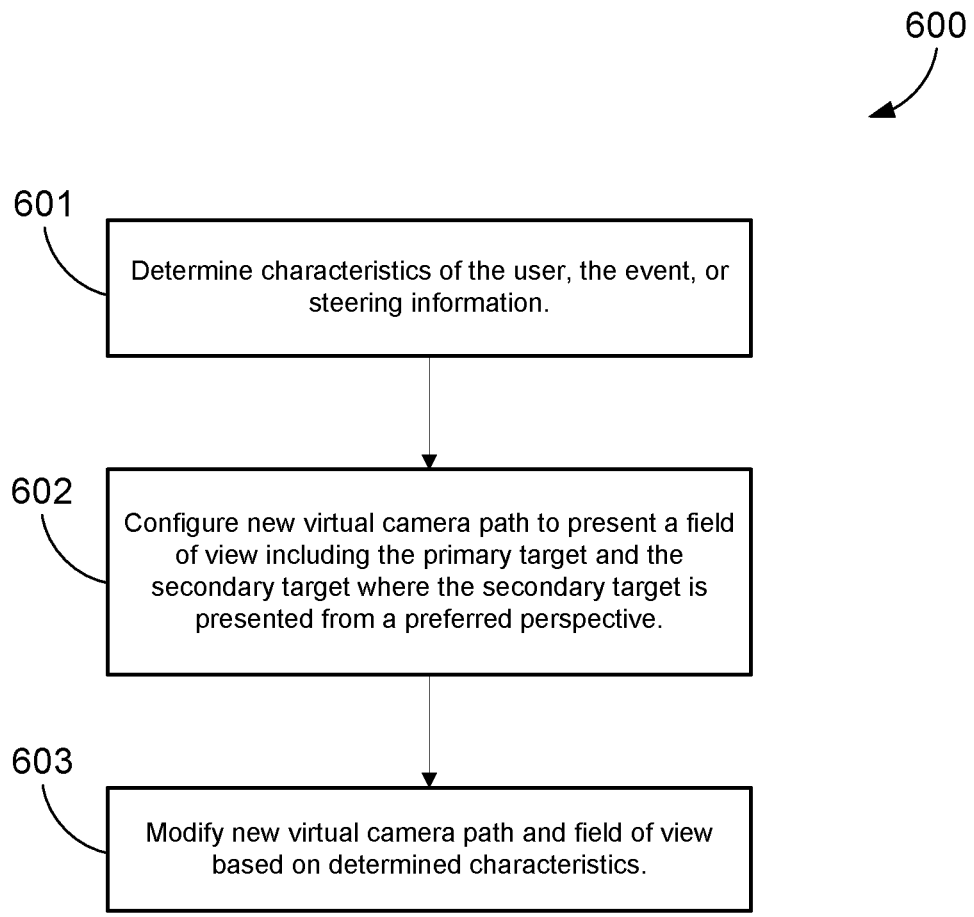
FIG. 6 shows a method of configuring a path of a virtual camera.

FIG. 6 shows a method 600 of modifying a virtual camera path. The method 600 can be implemented as an extension of, as part of (or in replacement of) step 205 of the method 200. The method 600 is typically implemented as one or more modules of the application 933, stored in the memory 906 and controlled under execution of the processor 905.

The method 600 starts with a determining step 601. Execution of the step 601 determines characteristics of at least one of the user, the event, or steering information. Examples of a user's characteristics include, but are not limited to, the user's identification (ID), job title, level of membership to a service, and the like. Examples of characteristics of an event include, but are not limited to, an amount of action (for example measured by an amount of total movement of objects in the scene or a total acoustic volume of the spectators), an elapsed time of a game, a time since a last event, a time since a last virtual camera configuration, occurrence of a particular event (for example a penalty shoot-out of a match) and the like. Examples of the steering information characteristics include, but are not limited to, the amount of controller input being inputted by the user, particular steerage characteristics changeable by the user, and the like.

The method 600 continues under execution of the processor 905 from step 601 to a configuring step 602. The step 602 operates in a similar manner to step 205 of the method 200 to configure the virtual camera path to present a field of view including the primary target and the secondary target where the secondary target is presented from a preferred perspective.

The method 600 continues from step 602 to a modifying step 603. In executing the step 603 the application 933 modifies or configures the new virtual camera path and field of view based on the characteristics determined in step 601. The modification of the new virtual camera path is to vary the effect of the arrangements described based on the user providing steerage information for the camera. There may be particular cases where the user is granted choice of whether to configure the virtual camera path to include both the primary and the secondary targets. Alternatively, there may be cases when modifying the virtual camera path to include both the primary and the secondary target as described is inopportune. Step 603 operates to determine a level of modification or configuration of the path of the virtual camera relative to the configuration determined at step 205 or, in some implementations, in place of step 205.

Depending on the amount of the modification implemented at step 603, the new camera path can change to be more in line with the original future camera path 515. The effect of step 603 can cause the virtual camera 510 to not view the secondary target from a preferred perspective. However, step 603 can be implemented to benefit the user experience in some instances, while also maintaining a likelihood that the secondary target will partially be within the field of view.

Figure 7:
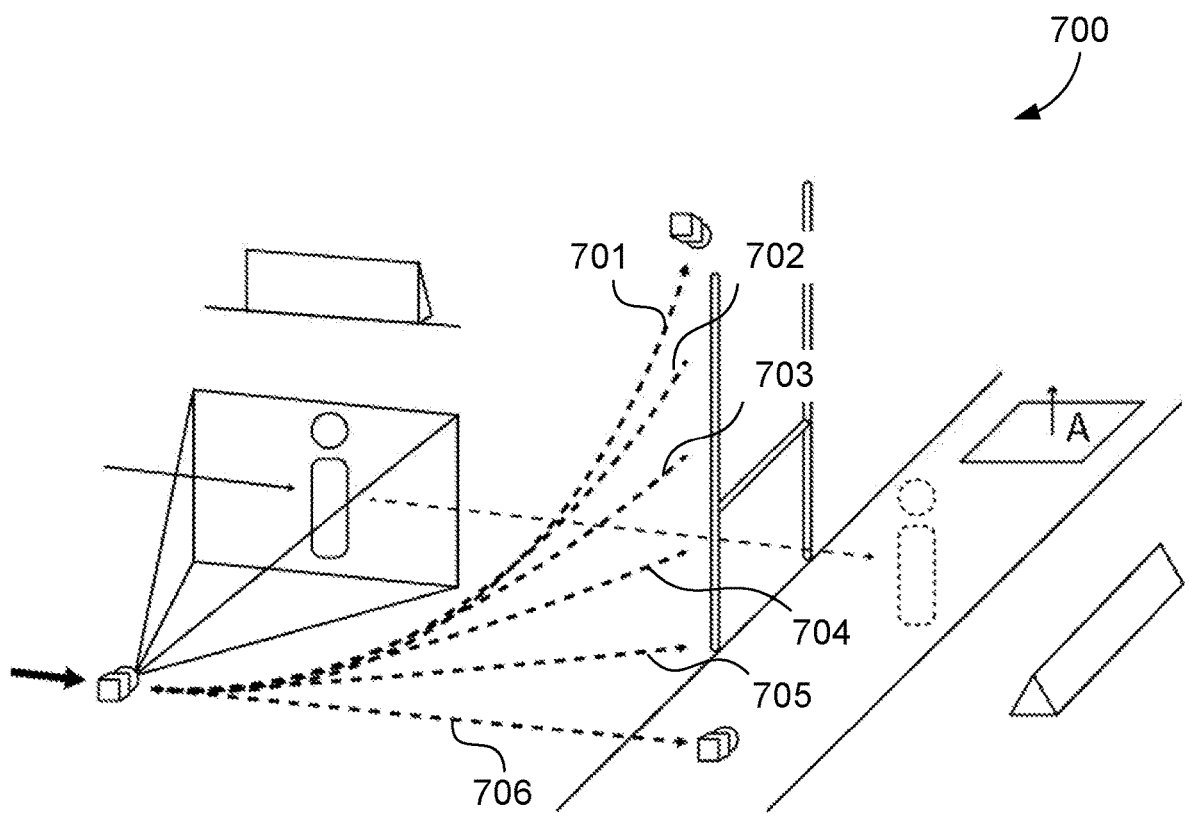
FIG. 7 shows examples path modifications for a virtual camera for an example scene.

FIG. 7 shows a scene 700 corresponding to the scenes 500a and 500b of FIGS. 5A and 5B. FIG. 7 shows a number of examples of how a new virtual camera path is modified in execution of step 603. FIG. 7 portrays six different camera paths 701 to 706, each including a different level of modification at step 603. Path 701 represents the future camera path 533 without any modification. The path 706 represents the future camera path 533 with a maximum amount of modification.

In the example of FIG. 7 the maximum amount of modification relates to modification whereby the new virtual camera path resembles the estimated future camera path 515. The paths 701 to 706 represent paths of varying modification amounts While FIG. 7 shows four intermediary paths (702 to 705) between the unmodified path (701) and the maximum modified path (706), many more paths could exist. Further, while FIG. 7 shows only varying the virtual camera path, the step 603 can also operate to modify the field of view of the virtual camera by modifying camera parameters that do not affect a path (such as tilt, zoom and the like) in addition to modifying or configuring the path.

The example paths 701 to 706 illustrate how the determined characteristics of step 601 can influence the new virtual camera path and field of view. In one example, the user controlling the virtual camera may be a non-paying user. To compensate the user's free access to the application 933, providers of the application 933 may specify that the user experience the full effect of the camera path modification to incorporate a preferred perspective of the secondary target. Under this condition the application executes step 603 to retain the new camera path 701, effectively maintaining the same path established in step 602.

In another example, the user controlling the virtual camera may be a paying user. In exchange for the user's payment, the providers of the application 933 may specify that the user experiences operation of the methods described infrequently, or maybe not at all. Under this condition the application in step 603 modifies the camera path to either reduce the magnitude of camera path adjustment or reduce the magnitude of camera adjustment to zero. An illustration of potential resultant paths in FIG. 7 is provided by the camera paths 702 to 706.

In another example, the user controlling the virtual camera 510 may be a professional broadcast camera operator. A requirement of some camera operators is complete control of the camera at all time. Under this condition the application in step 603 modifies the camera path to reduce the magnitude of virtual camera path adjustment to zero. An illustration of a resultant camera path in FIG. 7 could be new the camera path 706 for example.

In another example, the amount of action in the event could vary. For example, if the amount of action is high (measured by a total amount of movement by potential primary targets in the scene), the user controlling the camera may desire uninterrupted control of the camera. Under the high action condition the application in step 603 modifies the camera path to either reduce the magnitude of virtual camera path adjustment, or reduce the magnitude of virtual camera adjustment to zero. If, for example, the amount of action is low, the user controlling the camera may be tolerant of some level of camera path adjustment. Under this condition the application 933 in step 603 may retain the new camera path, that is maintain the same path established in step 602. An illustration of a corresponding path in FIG. 7 could be the camera paths 702 to 706.

In another example, the magnitude of camera path variation could be triggered based on an elapsed time of since the last configuration event. Online streaming content may automatically display advertisements at a certain time-based interval. Similarly, the amount of modification could vary based on time. In applications varying modification based on time, the application in step 603 could modify the new camera path so that no effect is felt for the majority of the time. In FIG. 7 the modification would relate to generating the path 706. When an amount of time has elapsed, the application could modify the new camera path to include the primary target and the secondary target where the secondary target is presented from a preferred perspective fully. Alternatively, the secondary target could be presented partially from the preferred perspective. In FIG. 7 the paths 701 to 705 represent possible resultant paths.

In another example, the magnitude of camera path variation could be triggered to coincide with the timing and phases of the event or game. For example, a game may go through multiple phases where the game is in play and when there is a stoppage in play, such as the time before and after a goal is scored. In implementations varying camera path using timing or events, the application in step 603 could modify the new camera path so that no modification occurs while the game is in play. However, during a stoppage the application could modify the new camera path to include the primary target and the secondary target where the secondary target is presented from a preferred perspective either fully or partially. Depending on the condition of the game, in FIG. 7 the result could be one of the paths 701 to 706.

In another example, the effect of the invention could vary depending on the characteristics of the user's steering information. For example, if the user may apply a strong input via the user input device 913. A strong input may mean the user has pushed a joystick all the way for example, signifying that the user has a strong desire to move the camera in the fastest speed possible. Under this condition, the application in step 603 could modify the new camera path so that no modification occurs while there is a strong user input. In FIG. 7 the result would be the path 706 for example. However, when the user is applying moderate input to user input device 913, the application 933 moderately modifies the new camera path. In FIG. 7 the resultant camera path could be one of the paths 701 to 705.

Figure 8:
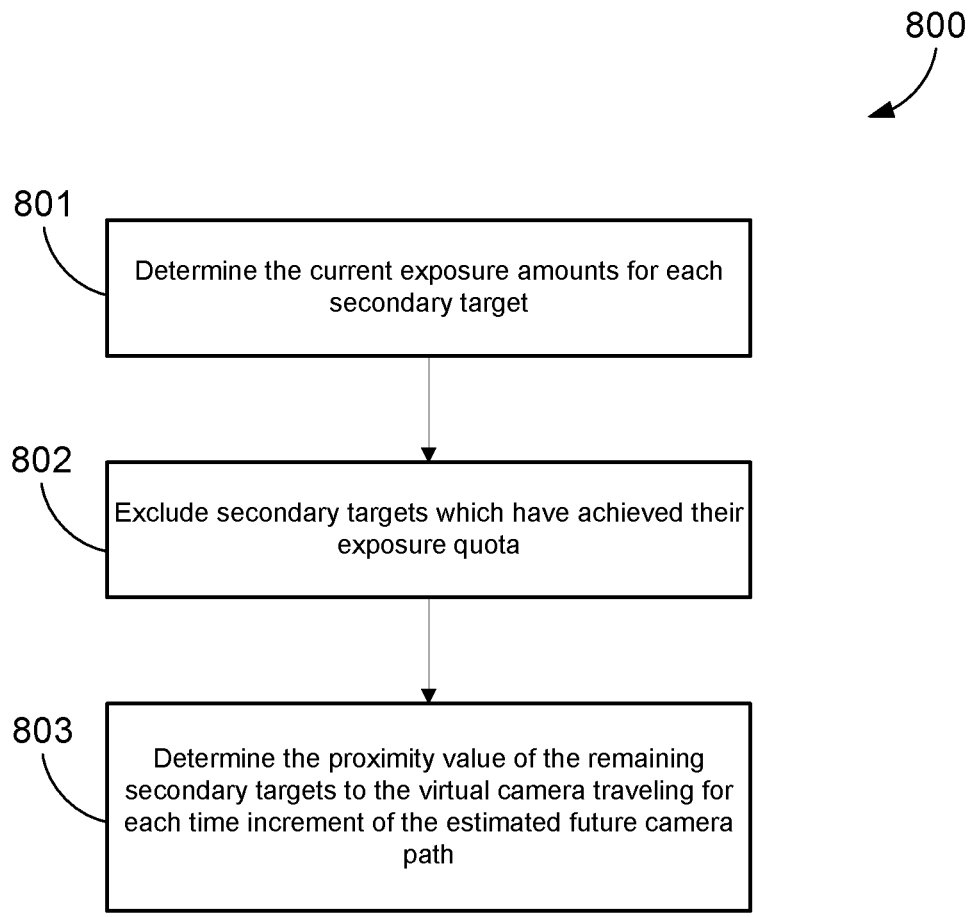
FIG. 8 shows a method of filtering secondary targets based on attained exposure.

FIG. 8 shows a method 800 for filtering secondary targets based on each target's attained exposure for an event. The method 800 is typically implemented as one or more modules of the application 933, stored in the memory 906 and controlled under execution of the processor 905.

The method 800 can be implemented as part of, or in place of step 301 of FIG. 3. The method 800 begins at a determining step 801. Execution of step 801 determines the current exposure amounts for each secondary target. Each secondary target can have an amount or level of exposure which is attained during the broadcast. The amount or level of exposure can be based on the amount of advertising revenue associated with a target provided to the broadcaster, or to the rights holder. In the context of the example described, the exposure is measured by the amount of time that the secondary target (or part of the secondary target) has been within the field of view of the virtual camera of the broadcast. If not limited to the field of view of the virtual camera, exposure can be determined based on the appearance of the secondary target in all other cameras of the broadcast, whether virtual or physical.

The method 800 continues from step 801 to an excluding step 802. Step 802 excludes secondary targets that have achieved a corresponding exposure quota. For example, a requirement of the secondary target may be that the secondary target receives a certain amount of exposure during a broadcast. In a broadcast, multiple secondary targets could be competing for exposure. Once the application 933 has determined the exposure amounts and determined that a secondary target has achieved the corresponding exposure quota, the application 933 can exclude that secondary target and prioritize other secondary targets in the scene.

The method 800 continues from step 802 to a determining step 803. Execution of step 803 performs the same task as step 301 and determines the proximity value of the remaining secondary targets to the virtual camera traveling for each time increment of the estimated future camera path.

The arrangements described are applicable to the computer and data processing industries and particularly for the sports broadcast or event broadcast industries.

In particular, the arrangements described operate to allow configuration of a virtual camera in a dynamic manner (based on user steerage input) to allow a secondary target to be captured from a preferred perspective while maintaining the primary target in resultant video data. The arrangements described also allow potential modification of the level of configuration of the virtual camera based on characteristics of the user, the scene, the steerage information received and the like.

The foregoing describes only some embodiments of the present invention, and modifications and/or changes can be made thereto without departing from the scope and spirit of the invention, the embodiments being illustrative and not restrictive.

The claim(s) defining the invention are as follows:

1. A method for an apparatus to configure a path of a virtual camera, the method comprising:
    receiving user steering information of a user to control the path of the virtual camera in a scene;
    determining a primary target based upon a field of view of the virtual camera;
    estimating, based on the received steering information, a future path and a corresponding future field of view of the virtual camera;
    determining a secondary target of the scene proximate to the estimated future path of the virtual camera based on a preferred perspective of the secondary target; and
    configuring the path to capture the secondary target from the preferred perspective and the primary target in a resultant field of view of the virtual camera.

2. The method according to claim 1, wherein the secondary target is determined based on a magnitude of adjustment to the received user steering information to configure the path to capture the secondary target from the preferred perspective in the field of view.

3. The method according to claim 1, wherein the secondary target is determined based on a proximity to a predicted final destination of the primary target.

4. The method according to claim 1, wherein the secondary target is determined based on a level of exposure of the secondary target during an event.

5. The method according to claim 1, wherein the secondary target is determined based on a level of exposure of the secondary target during an event, wherein the level of exposure is related to advertising revenue associated with the target.

6. The method according to claim 1, wherein configuring the path of the virtual camera is further based on a determined characteristic of the user.

7. The method according to claim 1, wherein configuring the path of the virtual camera is further based on a magnitude of the received user steering information.

8. The method according to claim 1, wherein configuring the path of the virtual camera is further based on a time since a last virtual camera configuration.

9. The method according to claim 1, wherein configuring the path of the virtual camera is further based on an amount of movement of the primary target.

10. The method according to claim 1, wherein the scene is a sporting match and configuring the path is further based on occurrence of an event of the sporting match.

11. The method according to claim 1 wherein configuring the path of the virtual camera includes modifying at least one orientation parameter of the virtual camera.

12. The method according to claim 1 wherein configuring the path of the virtual camera includes modifying at least one positional parameter of the virtual camera.

13. The method according to claim 1, wherein the secondary target is not visible in image data captured of the scene.

14. The method according to claim 1, wherein the secondary target is not visible in image data captured of the scene, and the secondary target is augmented onto image data captured by the virtual camera using the configured path.

15. The method according to claim 1, wherein the received user steerage information relates to receiving an indication of a trajectory of the virtual camera.

16. The method according to claim 1, wherein the received user steerage information relates to panning the virtual camera.

17. The method according to claim 1, further comprising determining a level of modification of the path of the virtual camera based upon a characteristic of the user.

18. A non-transitory computer readable medium storing a program to cause a computer to perform a method for an apparatus to configure a path of a virtual camera, the method comprising:
    receiving user steering information of a user to control the path of the virtual camera in a scene;
    determining a primary target based upon a field of view of the virtual camera;
    estimating, based on the received steering information, a future path and a corresponding future field of view of the virtual camera;
    determining a secondary target of the scene proximate to the estimated future path of the virtual camera based on a preferred perspective of the secondary target; and
    configuring the path to capture the secondary target from the preferred perspective and the primary target in a resultant field of view of the virtual camera.

19. A system; comprising:
    a network of cameras; and
    an apparatus to configure a path of a virtual camera and having:
    one or more processors, and
    memory storing instructions that, when executed by the one or more processors, cause the apparatus to perform operations including:
    receiving user steering information of a user to control the path of the virtual camera in a scene,
    determining a primary target based upon a field of view of the virtual camera, estimating, based on the received steering information, a future path and a corresponding future field of view of the virtual camera, determining a secondary target of the scene proximate to the estimated future path of the virtual camera based on a preferred perspective of the secondary target; and configuring the path to capture the secondary target from the preferred perspective and the primary target in a resultant field of view of the virtual camera.

20. An apparatus to configure a path of a virtual camera, the apparatus comprising:

one or more processors; and memory storing instructions that, when executed by the one or more processors, cause the apparatus to perform operations including:

receiving user steering information of a user to control the path of the virtual camera in a scene, determining a primary target based upon a field of view of the virtual camera, estimating, based on the received steering information, a future path and a corresponding future field of view of the virtual camera, determining a secondary target of the scene proximate to the estimated future path of the virtual camera based on a preferred perspective of the secondary target; and configuring the path to capture the secondary target from the preferred perspective and the primary target in a resultant field of view of the virtual camera.

* * * * *